United States Patent
Chase et al.

(10) Patent No.: US 11,951,857 B2
(45) Date of Patent: Apr. 9, 2024

(54) LIQUID COOLED ELECTRICAL CONNECTORS

(71) Applicant: FORD GLOBAL TECHNOLOGIES, LLC, Dearborn, MI (US)

(72) Inventors: Nicholas B. Chase, Royal Oak, MI (US); Myung Ki Sung, Ypsilanti, MI (US); Man Prakash Gupta, Dearborn, MI (US); Alfredo R. Munoz, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 363 days.

(21) Appl. No.: 17/089,105

(22) Filed: Nov. 4, 2020

(65) Prior Publication Data

US 2022/0134896 A1  May 5, 2022

(51) Int. Cl.
| | |
|---|---|
| H01R 13/66 | (2006.01) |
| B60L 53/18 | (2019.01) |
| B60L 53/302 | (2019.01) |
| H01R 9/11 | (2006.01) |
| H01R 13/00 | (2006.01) |

(52) U.S. Cl.
CPC ............ *B60L 53/302* (2019.02); *B60L 53/18* (2019.02); *H01R 9/11* (2013.01); *H01R 13/005* (2013.01); *H01R 2201/26* (2013.01)

(58) Field of Classification Search
CPC .......... B60L 53/302; B60L 53/18; H01R 9/11; H01R 13/005; H01R 2201/26; Y02T 10/70; Y02T 10/7072; Y02T 90/12; Y02T 90/14
See application file for complete search history.

(56) References Cited

U.S. PATENT DOCUMENTS

| | | | |
|---|---|---|---|
| 9,701,210 B2 * | 7/2017 | Woo ..................... | B60L 53/11 |
| 10,236,791 B1 * | 3/2019 | Chung ................... | H02K 11/25 |
| 10,756,498 B1 * | 8/2020 | Sarraf ................... | B60L 53/302 |
| 10,938,137 B2 * | 3/2021 | Eriksson ................ | F16L 37/23 |
| 10,988,041 B2 * | 4/2021 | de Chazal ............. | H01R 13/005 |
| 2003/0132040 A1 * | 7/2003 | Radosevich ........... | B60L 50/15 180/65.1 |
| 2003/0132041 A1 * | 7/2003 | Beihoff .................. | B60L 50/15 180/65.1 |
| 2003/0132042 A1 * | 7/2003 | Beihoff .................. | B60L 50/15 180/65.1 |
| 2003/0133319 A1 * | 7/2003 | Radosevich ........... | H02M 7/003 363/141 |
| 2004/0206558 A1 * | 10/2004 | Kabasawa ............. | B60L 3/0061 903/952 |

(Continued)

FOREIGN PATENT DOCUMENTS

| | | |
|---|---|---|
| CN | 210182630 U | 3/2020 |
| EP | 3691427 A1 | 8/2020 |
| WO | 2017/143295 A1 | 8/2017 |

*Primary Examiner* — Abdullah A Riyami
*Assistant Examiner* — Nelson R. Burgos-Guntin
(74) *Attorney, Agent, or Firm* — David B. Kelley; Carlson, Gaskey & Olds, P.C.

(57) ABSTRACT

This disclosure describes liquid cooled electrical connectors for connecting components of electrified vehicles or components of any other type of power connection/power transfer system. Exemplary electrical connectors include integrated cooling circuits that employ heat exchanger channels for circulating a fluid for convectively cooling bus bars of the connector.

20 Claims, 6 Drawing Sheets

(56) References Cited

U.S. PATENT DOCUMENTS

| | | | | |
|---|---|---|---|---|
| 2007/0253164 | A1* | 11/2007 | Matsuo | H05K 7/20927 361/699 |
| 2008/0117602 | A1* | 5/2008 | Korich | H01G 11/82 361/715 |
| 2009/0213564 | A1* | 8/2009 | Kakuda | B60K 6/365 361/811 |
| 2013/0294040 | A1* | 11/2013 | Fukumasu | B60L 15/20 361/752 |
| 2014/0098588 | A1* | 4/2014 | Kaneko | H01L 24/36 363/141 |
| 2015/0217654 | A1* | 8/2015 | Woo | B60L 53/16 320/109 |
| 2015/0357692 | A1* | 12/2015 | Piggott | H02J 7/0068 29/623.2 |
| 2016/0242313 | A1* | 8/2016 | Singh | H05K 1/184 |
| 2016/0270257 | A1* | 9/2016 | Mark | H05K 7/20245 |
| 2016/0301058 | A1* | 10/2016 | Tyler | H01M 10/482 |
| 2017/0033638 | A1* | 2/2017 | Lei | H02K 11/0094 |
| 2017/0063066 | A1* | 3/2017 | Doo | H02G 5/005 |
| 2017/0373289 | A1* | 12/2017 | Lee | H01M 10/6562 |
| 2018/0013249 | A1* | 1/2018 | Schwan | H02B 11/04 |
| 2018/0065573 | A1* | 3/2018 | DeKeuster | H01M 50/209 |
| 2018/0130589 | A1* | 5/2018 | Yonak | H01F 27/2895 |
| 2019/0074620 | A1* | 3/2019 | Moseke | B60L 53/16 |
| 2019/0109409 | A1* | 4/2019 | Fuehrer | H01R 13/533 |
| 2019/0280611 | A1* | 9/2019 | Chung | H01L 25/072 |
| 2019/0291588 | A1* | 9/2019 | Chou | B60L 53/18 |
| 2019/0315239 | A1* | 10/2019 | Beimdieck | B60L 53/16 |
| 2019/0322186 | A1* | 10/2019 | Arai | H01B 9/00 |
| 2019/0366823 | A1* | 12/2019 | Pradeepkumar | H02M 7/5387 |
| 2019/0385765 | A1* | 12/2019 | Lyon | H01B 7/423 |
| 2020/0094689 | A1* | 3/2020 | Myer | H01R 13/639 |
| 2020/0169147 | A1* | 5/2020 | Söhnle | H02M 7/003 |
| 2020/0303093 | A1* | 9/2020 | Cantz | H01R 9/11 |
| 2020/0384875 | A1* | 12/2020 | Rhodes | B60L 53/11 |
| 2021/0063097 | A1* | 3/2021 | Hitchcock | F28F 9/0212 |
| 2022/0085557 | A1* | 3/2022 | Rhodes | H01R 13/6675 |
| 2022/0142012 | A1* | 5/2022 | Yonak | H05K 5/0008 361/699 |
| 2022/0311325 | A1* | 9/2022 | Wang | H02M 1/32 |
| 2022/0410743 | A1* | 12/2022 | Choi | B60L 53/16 |
| 2023/0116836 | A1* | 4/2023 | Rhodes | H01R 13/6616 320/109 |
| 2023/0119524 | A1* | 4/2023 | Scharkowski | H01M 50/502 429/120 |

* cited by examiner

LIQUID COOLED ELECTRICAL CONNECTORS

TECHNICAL FIELD

This disclosure relates generally to electrical connectors, and more particularly to electrical connectors that include integrated liquid cooling circuits.

BACKGROUND

Electrified vehicles differ from conventional motor vehicles because they are selectively driven by one or more traction battery pack powered electric machines. The electric machines can propel the electrified vehicles instead of, or in combination with, an internal combustion engine. Many electrified vehicles, such as plug-in hybrid electric vehicles (PHEVs) and battery electric vehicles (BEVs), include a multitude of high current electrical connectors for reliably connecting and transferring power between charging and powertrain components of the electrified vehicles.

SUMMARY

An electrical connector according to an exemplary aspect of the present disclosure includes, among other things, a housing and a bus bar extending within the housing. The housing includes an integrated cooling circuit that includes a heat exchanger channel disposed proximate to the bus bar. The heat exchanger channel is configured to receive a fluid for convectively cooling the bus bar.

In a further non-limiting embodiment of the foregoing electrical connector, the housing includes a thermally conductive polymer that includes a conductive filler.

In a further non-limiting embodiment of either of the foregoing electrical connectors, the conductive filler includes aluminum nitride or boron nitride.

In a further non-limiting embodiment of any of the foregoing electrical connectors, the heat exchanger channel includes a plurality of heat transfer augmentation features.

In a further non-limiting embodiment of any of the foregoing electrical connectors, the plurality of heat transfer augmentation features are configured as axial ribs, pins, or a lattice structure.

In a further non-limiting embodiment of any of the foregoing electrical connectors, the integrated cooling circuit includes an inlet junction passage and an outlet junction passage connected to the heat exchanger channel.

In a further non-limiting embodiment of any of the foregoing electrical connectors, the inlet junction passage connects to an inlet passage formed inside the housing, and the outlet junction passage connects to an outlet passage formed inside the housing.

In a further non-limiting embodiment of any of the foregoing electrical connectors, the integrated cooling circuit is incorporated into the housing without the use of separate mechanical fasteners.

In a further non-limiting embodiment of any of the foregoing electrical connectors, a potting compound is disposed in a gap between the heat exchanger channel and the bus bar.

In a further non-limiting embodiment of any of the foregoing electrical connectors, the integrated cooling circuit includes a plurality of heat exchanger channels.

An electrified vehicle according to another exemplary aspect of the present disclosure includes, among other things, an electrified powertrain component and an electrical connector connected to the electrified powertrain component. The electrical connector includes a housing, a bus bar, and an integrated cooling circuit disposed inside the housing at a location proximate the bus bar. A heat exchanger channel of the integrated cooling circuit is configured to receive a fluid for convectively cooling the bus bar.

In a further non-limiting embodiment of the foregoing electrified vehicle, the electrical connector is part of a charge port assembly of the electrified vehicle.

In a further non-limiting embodiment of either of the foregoing electrified vehicles, the electrified powertrain component is an on-board charger module, a traction battery pack, a power electronics module, or an electric machine.

In a further non-limiting embodiment of any of the foregoing electrified vehicles, the housing includes a thermally conductive polymer that includes a conductive filler.

In a further non-limiting embodiment of any of the foregoing electrified vehicles, the conductive filler includes aluminum nitride or boron nitride.

In a further non-limiting embodiment of any of the foregoing electrified vehicles, the heat exchanger channel includes a plurality of heat transfer augmentation features.

In a further non-limiting embodiment of any of the foregoing electrified vehicles, the plurality of heat transfer augmentation features are configured as axial ribs, pins, or a lattice structure.

In a further non-limiting embodiment of any of the foregoing electrified vehicles, the integrated cooling circuit includes an inlet junction passage and an outlet junction passage connected to the heat exchanger channel.

In a further non-limiting embodiment of any of the foregoing electrified vehicles, the inlet junction passage connects to an inlet passage formed inside the housing, and the outlet junction passage connects to an outlet passage formed inside the housing.

In a further non-limiting embodiment of any of the foregoing electrified vehicles, a potting compound is disposed in a gap between the heat exchanger channel and the bus bar.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes liquid cooled high current electrical connectors for connecting components of electrified vehicles or components of any other type of power connection/power transfer system. Exemplary high current electrical connectors include integrated cooling circuits that employ heat exchanger channels for circulating a fluid for convectively cooling bus bars of the connector. These and other features of this disclosure are discussed in greater detail in the following paragraphs of this detailed description.

Figure 1:
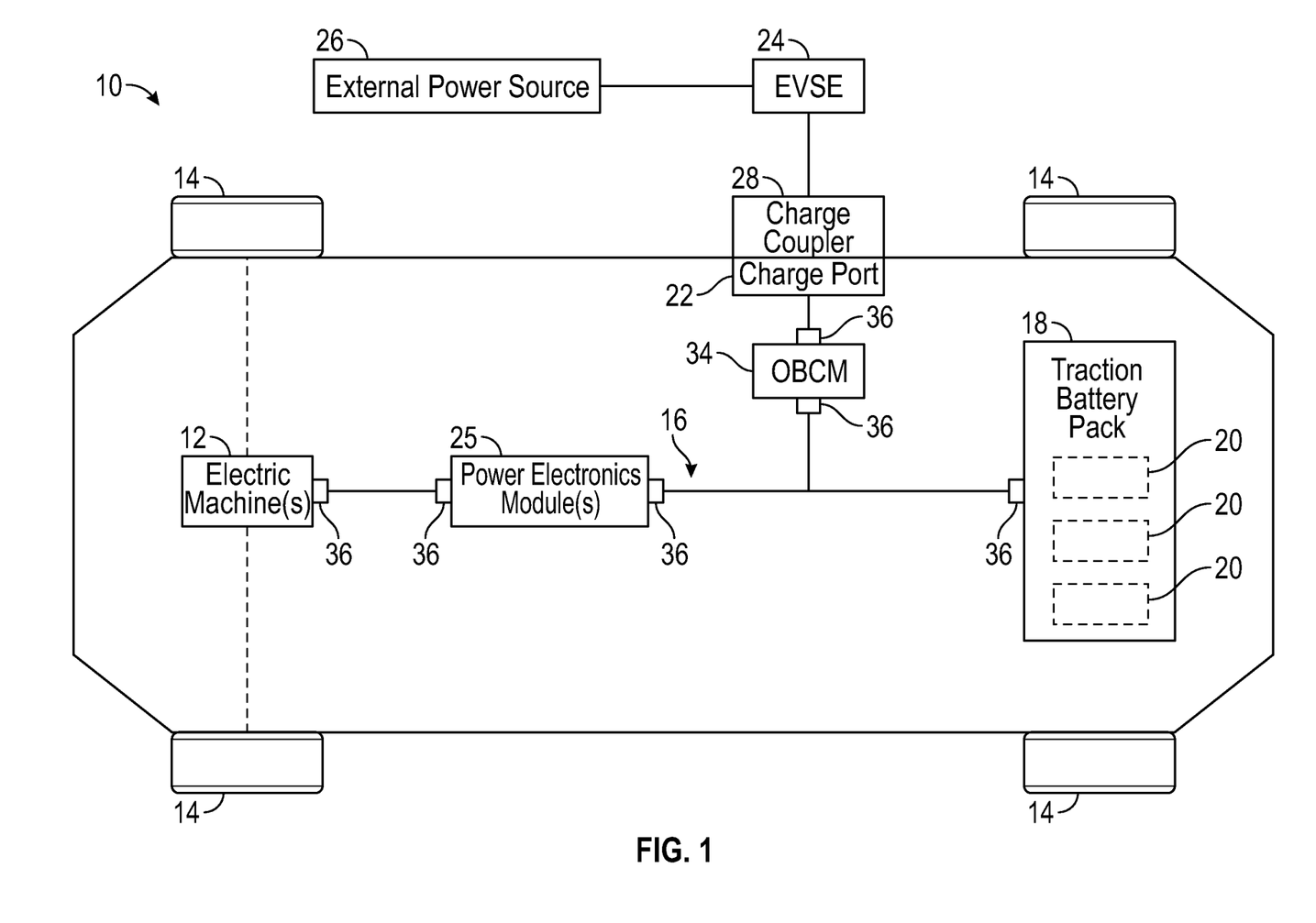
FIG. 1 schematically illustrates select portions of an electrified powertrain of an electrified vehicle.
Figure 2:
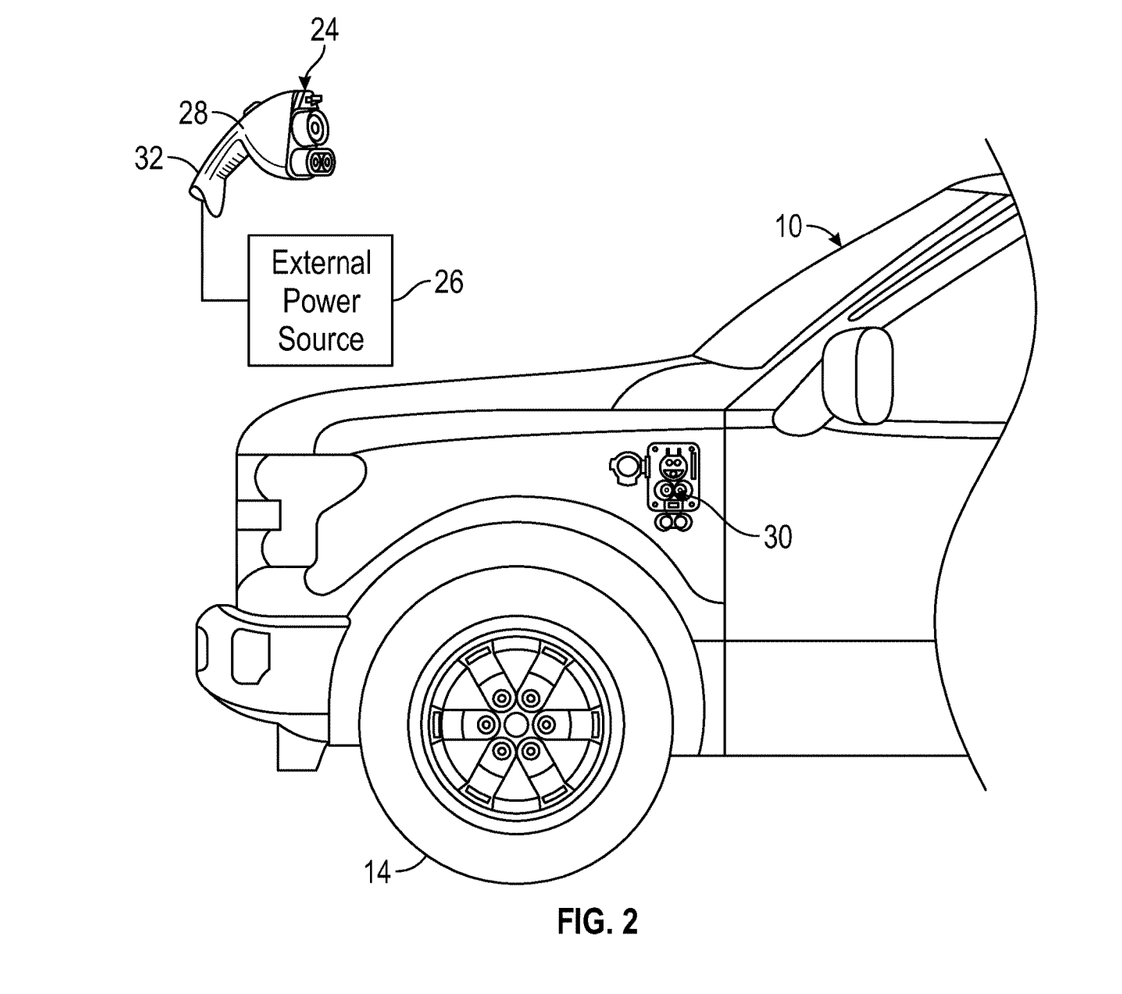
FIG. 2 schematically illustrates a charge port assembly of the electrified vehicle of FIG. 1.

FIGS. 1 and 2 schematically illustrate an electrified vehicle 10. The electrified vehicle 10 may include any type of electrified powertrain. In an embodiment, the electrified vehicle 10 is a battery electric vehicle (BEV) or a plug-in hybrid electric vehicle (PHEV). Therefore, although not specifically shown in this embodiment, the electrified vehicle 10 could be equipped with an internal combustion engine that can be employed either alone or in combination with other energy sources to propel the electrified vehicle 10.

The electrified vehicle 10 of FIG. 1 is schematically illustrated as a car. However, the teachings of this disclosure may be applicable to any type of vehicle, including but not limited to, cars, trucks, vans, sport utility vehicles (SUVs), etc. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component. Furthermore, as would be recognized by persons of ordinary skill in the art, the various concepts described herein are not limited to the field of electrified vehicles and could be applicable to any power connection/power transfer system.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14 of the electrified vehicle 10.

A high voltage bus 16 electrically connects the electric machine 12 to a traction battery pack 18 through a power electronics module 25. The traction battery pack 18 is an exemplary electrified vehicle traction battery. The traction battery pack 18 may be a high voltage traction battery pack that includes a plurality of battery arrays 20 (i.e., battery assemblies or groupings of rechargeable battery cells) capable of outputting electrical power to operate the electric machine 12 and/or other electrical loads of the electrified vehicle 10. Other types of energy storage devices and/or output devices can also be used to electrically power the electrified vehicle 10.

The power electronics module 25 may include a charger, a DC-DC converter, a motor controller (which may be referred to as an inverter system controller or ISC), etc. and is configured to bi-directionally transfer electrical energy between the traction battery pack 18 and the electric machine 12. For example, the traction battery pack 18 may provide a DC voltage while the electric machine 12 may operate via a three-phase AC voltage. The power electronics module 25 may convert the DC voltage to a three-phase AC voltage as required by the electric machine 12. The power electronics module 25 may further convert the high voltage DC output of the traction battery pack 18 to a lower voltage DC supply that is compatible with vehicle auxiliary loads.

From time to time, charging the energy storage devices of the traction battery pack 18 may be required or desirable. The electrified vehicle 10 may therefore be equipped with a charge port assembly 22 (sometimes referred to as a vehicle inlet assembly) for charging the energy storage devices (e.g., battery cells) of the traction battery pack 18. The charge port assembly 22 is one exemplary type of high current electrical connector that can be utilized within the electrified vehicle 10.

Electric vehicle supply equipment (EVSE) 24 may be operably connected between the charge port assembly 22 and an external power source 26 for transferring power therebetween. In an embodiment, the external power source 26 includes utility grid power. In another embodiment, the external power source 26 includes an alternative energy source, such as solar power, wind power, etc. In yet another embodiment, the external power source 26 includes a combination of utility grid power and alternative energy sources. The external power source 26 may be located at a home of the user, a public charging station, etc.

The EVSE 24 may include a charger coupler 28 that can be coupled to an inlet port 30 (see FIG. 2) of the charge port assembly 22 to charge the traction battery pack 18 of the electrified vehicle 10 from the external power source 26. A cable 32 of the EVSE 24 may connect between the charger coupler 28 and a power outlet or charging station that is operably connected to the external power source 26.

The inlet port 30 of the exemplary charge port assembly 22 may be configured to receive AC power from the external power source 26. In another embodiment, the inlet port 30 of the charge port assembly 22 is configured to receive DC power from the external power source 26. In yet another example, the inlet port 30 is a combined AC/DC charge port that is configured to receive AC power, DC power, or both from the external power source 26. The EVSE 24 may thus be configured to provide any level of charging (e.g., level 1, level 2, DC fast charging, etc.).

The charge port assembly 22 may be electrically connected to an on-board charger module (OBCM) 34. The on-board charger module 34 is configured to condition the power supplied from the EVSE 24 to provide the proper voltage and current levels to the traction battery pack 18.

A multitude of high current electrical connectors 36 may be utilized to connect the various components of the electrified powertrain of the electrified vehicle 10. The high current electrical connectors 36, in combination with various cables and wiring harnesses (not shown), enable the connection and transfer of power between the charging and powertrain components of the electrified vehicle 10.

Speed of charging is a common issue associated with charging electrified vehicles. As vehicle traction batteries become larger and larger, more power is required to charge the traction battery packs in the same amount of time. The current levels required to meet the increased power requirements can generate significant amounts of heat. Thermal management solutions are thus required to manage the heat generated during high current charging rates. This disclosure therefore describes liquid cooled high current electrical connectors capable of achieving higher charging rates within power connection/transfer systems.

Figure 3:
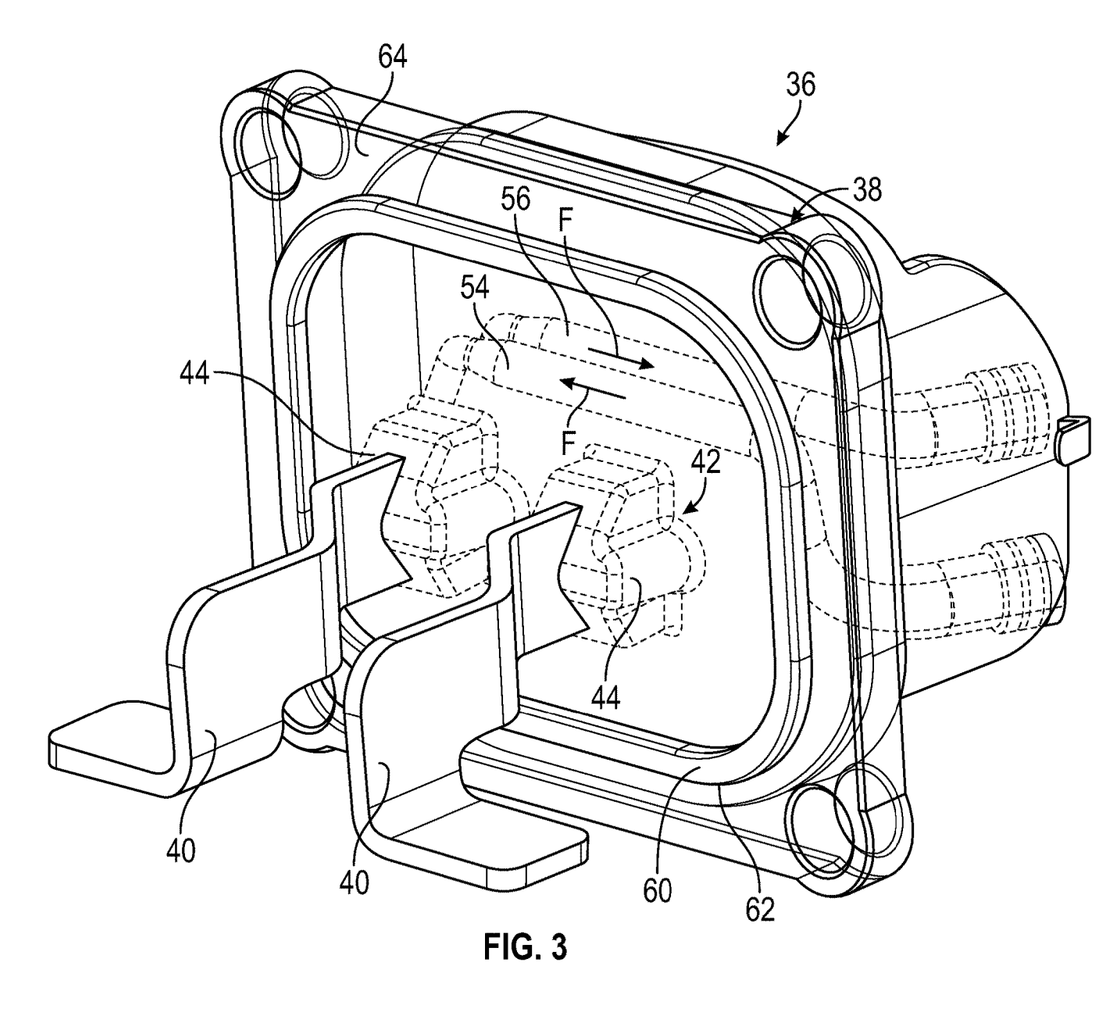
FIG. 3 illustrates an exemplary high current electrical connector.

FIG. 3 illustrates an exemplary high current electrical connector 36. The high current electrical connector 36 may be employed for use within the electrified vehicle 10 of FIG. 1, or within any other power connection/power transfer system that involves the transfer of high current power. In other words, the high current electrical connectors 36 of this disclosure may have applicability outside of the field of electrified vehicles.

The high current electrical connector 36 may include a housing 38 and one or more bus bars 40 extending within the housing 38. The bus bars 40 are the current carrying members of the high current electrical connector 36. Although two bus bars 40 are shown in the figures, the high current electrical connector 36 could include a greater or fewer number of bus bars 40 within the scope of this disclosure.

In an embodiment, the housing 38 is a polymeric structure and the bus bars 40 are metallic structures. The sizes and shapes of the housing 38 and the bus bars 40 are not intended to limit this disclosure.

The housing 38 may be a single-piece structure made of a thermally conductive polymer. The thermally conductive polymer is configured to conduct heat from the bus bars 40 into the housing 38 while also electrically insulating the bus bars 40 from nearby metallic components. In an embodiment, the thermally conductive polymer is a polymer (e.g., polypropylene or other suitable polymers) that is loaded with a conductive filler, such as aluminum nitride or boron nitride. However, other materials are also contemplated within the scope of this disclosure. The conductive filler may increase the conductivity of the polymer by a factor of twenty or more, in an embodiment. To "load" the polymer with the conductive fillers, a percentage by weight of the conductive filler may be added to the extruder when compounding the thermally conductive polymer.

The bus bars 40 may be stamped, relatively thin strips of metal that are configured to conduct current. Exemplary bus bar materials include copper, brass, or aluminum, although other conductive materials may also be suitable. In an embodiment, the bus bars 40 are high current bus bars having relatively high amperage capacities.

A relatively significant amount of heat may be generated by the bus bars 40 during current carrying conditions. Therefore, the housing 38 of the high current electrical connector 36 may include an integrated cooling circuit 42. As further explained below, the integrated cooling circuit 42 may include a series of interconnected channels and passages adapted to circulate a fluid F for removing heat from the bus bars 40 as part of a convective heat transfer process, for example. The integrated cooling circuit 42 is "integrated" in that it is integrally formed as part of the housing 38 rather than being a separate structure that must be fixedly secured to the housing 38. Thus, the integrated cooling circuit 42 is incorporated into the housing 38 without requiring the use of separate mechanical fasteners such as screws or bolts, for example.

The fluid F that is circulated through the integrated cooling circuit 42 may be water mixed with ethylene glycol or any other suitable coolant. The fluid F may be communicated as part a closed thermal management loop. In an embodiment, the fluid F is communicated from a battery cooling loop or a HVAC cooling loop of the electrified vehicle 10. In another embodiment, the fluid F is communicated as part of a dedicated cooling loop of the high current electrical connector 36.

Figure 4:
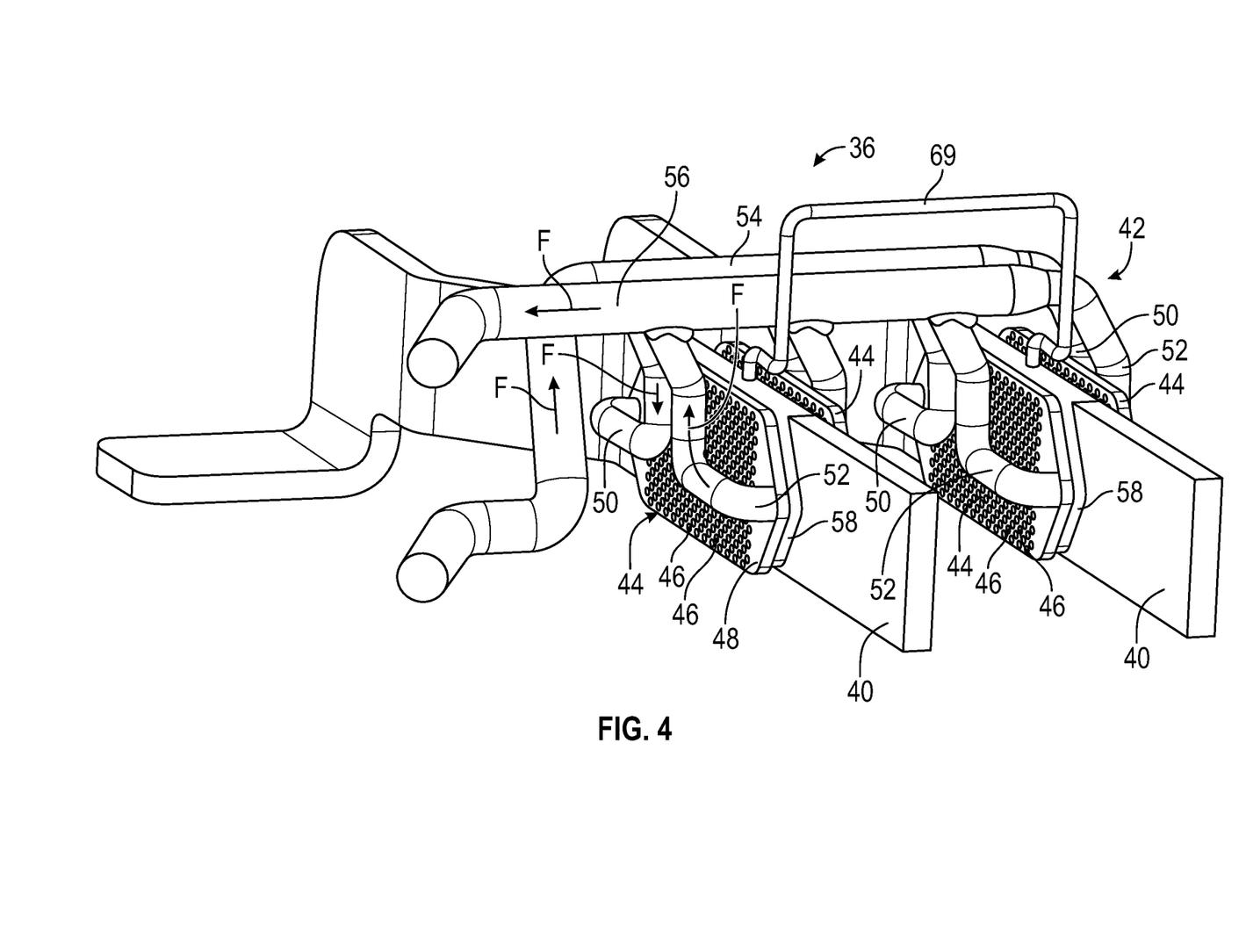
FIG. 4 illustrates an integrated cooling circuit of the high current electrical connector of FIG. 3.

Referring now to FIGS. 3 and 4, the integrated cooling circuit 42 may include one or more heat exchanger (e.g., heat sink) channels 44 disposed proximate to each bus bar 40. In an embodiment, one heat exchanger channel 44 is positioned on each side of each bus bar 40 to increase the amount of surface area available for heat transfer. However, the total number of heat exchanger channels 44 provided as part of the integrated cooling circuit 42 is not intended to limit this disclosure.

Each heat exchanger channel 44 may be a relatively long, narrow channel configured for circulating the fluid F relative to an adjacent one of the bus bars 40. The heat exchanger channels 44 may include a plurality of heat transfer augmentation features 46 adapted for increasing the convective heat transfer between the fluid F and the bus bars 40.

Figure 5:
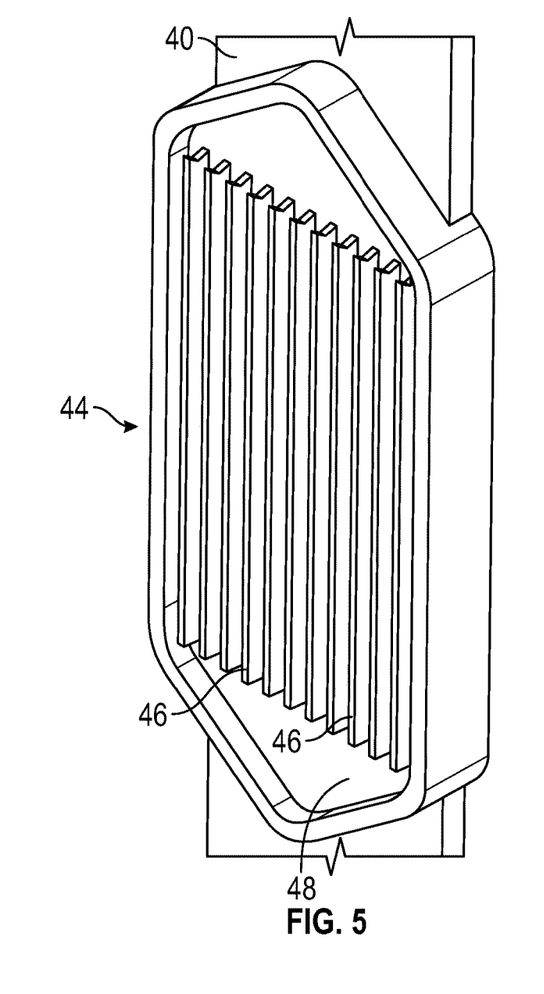
FIG. 5 illustrates heat transfer augmentation features of the integrated cooling circuit of FIG. 4 according to an exemplary embodiment of this disclosure.
Figure 6:
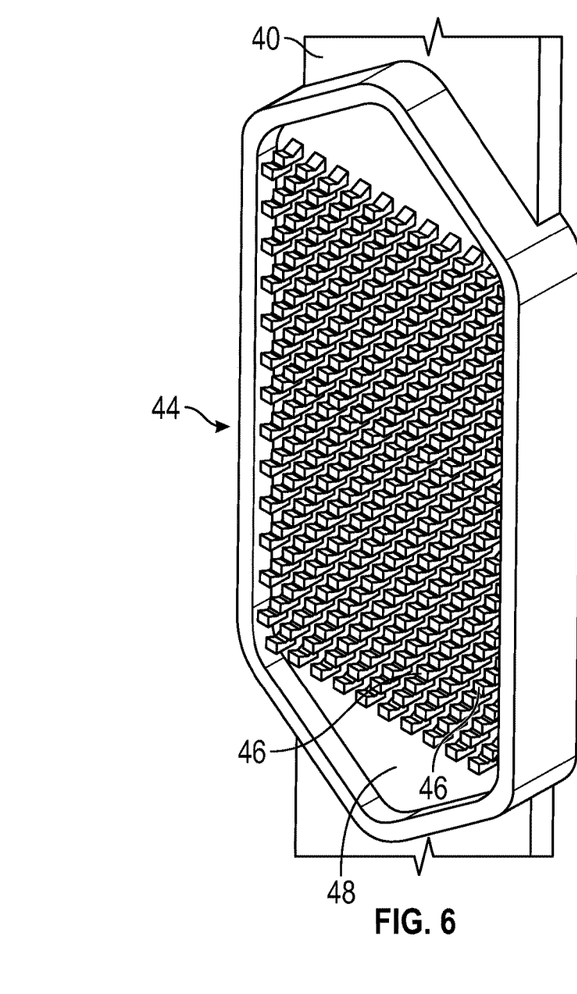
FIG. 6 illustrates heat transfer augmentation features of the integrated cooling circuit of FIG. 4 according to another exemplary embodiment of this disclosure.
Figure 7:
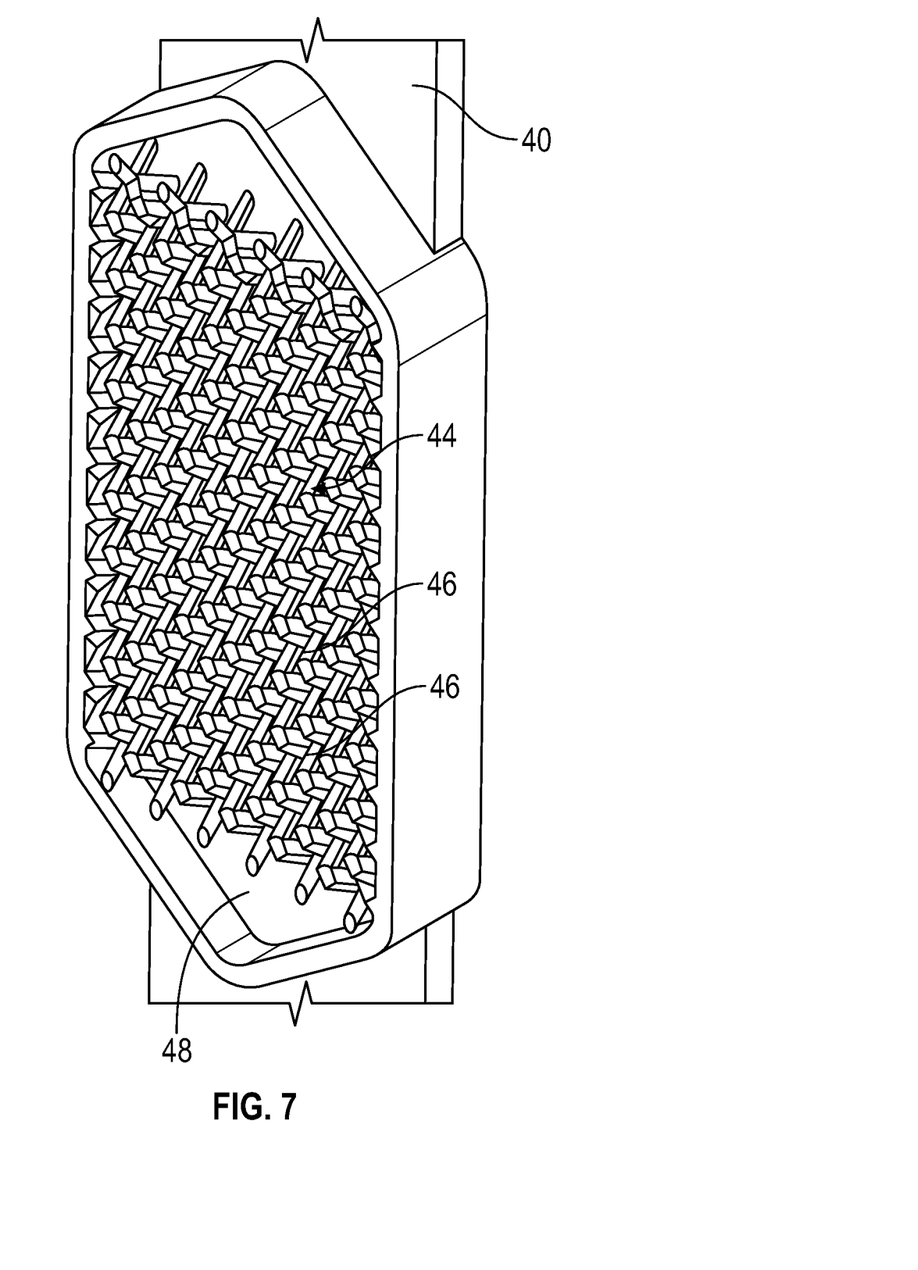
FIG. 7 illustrates heat transfer augmentation features of the integrated cooling circuit of FIG. 4 according to yet another exemplary embodiment of this disclosure.

The heat transfer augmentation features 46 may protrude from a wall 48 of each heat exchanger channel 44. In an embodiment, the heat transfer augmentation features 46 are configured as axial ribs (see FIG. 5). In another embodiment, the heat transfer augmentation features 46 are configured as pins (see FIG. 6). In yet another embodiment, the heat transfer augmentation features 46 are configured to establish a complex lattice structure (see FIG. 7). However, other configurations or combinations of configurations of the heat transfer augmentation features 46 are also contemplated within the scope of this disclosure.

The integrated cooling circuit 42 may additionally include one or more inlet junction passages 50, one or more outlet junction passages 52, an inlet passage 54, and an outlet passage 56 that are each formed in the housing 38. The inlet junction passages 50 may each connect between the inlet passage 54 and one of the heat exchanger channels 44, and the outlet junction passages 52 may each connect between the outlet passage 56 and one of the heat exchanger channels 44. The fluid F may enter the heat exchanger channels 44 through the inlet junction passages 50 from the inlet passage 54, and the fluid F may exit from the heat exchanger channels 44 through the outlet junction passages 52 into the outlet passage 56. The fluid F may therefore be circulated through the integrated cooling circuit 42 in a closed loop fashion.

In an embodiment, the inlet junction passages 50, the outlet junction passages 52, the inlet passage 54, and the outlet passage 56 each includes a generally circular cross-sectional shape. However, other shapes may also be suitable within the scope of this disclosure.

A potting compound 58 (see FIG. 4) may be disposed around each bus bar 40 for filling the volume of space between the bus bars 40 and the structure of the housing 38 that establishes the heat exchanger channels 44. The potting compound 58 is also configured for removing air gap thermal resistance between the housing 38 and the bus bars 40 during manufacturing. Sections of the potting compound 58 that surround the bus bars 40 may be connected by a runner 69 of the potting compound 58.

The high current electrical connector 36 may additionally include a seal 60 (see FIG. 3). The seal 60 may be a gasket seal received within a groove 62 formed in a rear face 64 of the housing 38, in an embodiment.

The high current electrical connectors of this disclosure employ liquid cooling schemes that are integrated as part of the connector housing. The liquid cooling schemes provide a manner for actively cooling the connectors, thereby accommodating higher charging rates as compared to current designs. Among other benefits, the exemplary high current electrical connectors reduce material and manufacturing costs due to fewer pieces and fewer assembly operations.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An electrical connector, comprising:
a housing; and
a bus bar extending within the housing,
wherein the housing includes an integrated cooling circuit that includes a first heat exchanger channel disposed on a first side of the bus bar and a second heat exchanger channel disposed on a second side of the bus bar,
wherein the first heat exchanger channel and the second heat exchanger channel are each configured to receive a fluid for convectively cooling the bus bar.

2. The electrical connector as recited in claim 1, wherein the housing is comprised of a thermally conductive polymer that includes a conductive filler.

3. The electrical connector as recited in claim 2, wherein the conductive filler includes aluminum nitride or boron nitride.

4. The electrical connector as recited in claim 1, wherein the first heat exchanger channel includes a plurality of heat transfer augmentation features.

5. The electrical connector as recited in claim 4, wherein the plurality of heat transfer augmentation features are configured as axial ribs, pins, or a lattice structure.

6. The electrical connector as recited in claim 1, wherein the integrated cooling circuit includes an inlet junction passage and an outlet junction passage connected to the first heat exchanger channel.

7. The electrical connector as recited in claim 6, wherein the inlet junction passage connects to an inlet passage formed inside the housing, and the outlet junction passage connects to an outlet passage formed inside the housing.

8. The electrical connector as recited in claim 1, wherein the integrated cooling circuit is incorporated into the housing without the use of separate mechanical fasteners.

9. The electrical connector as recited in claim 1, comprising a potting compound disposed in a gap between the first heat exchanger channel and the bus bar.

10. An electrified vehicle, comprising:
an electrified powertrain component; and
an electrical connector connected to the electrified powertrain component,
wherein the electrical connector includes a housing, a bus bar extending within the housing, and an integrated cooling circuit disposed inside the housing at a location proximate the bus bar,
wherein at least a portion of the bus bar is located axially between a first heat exchanger channel and a second heat exchanger channel of the integrated cooling circuit,
wherein the first heat exchanger channel and the second heat exchanger channel of the integrated cooling circuit are each configured to receive a fluid for convectively cooling the bus bar.

11. The electrified vehicle as recited in claim 10, wherein the electrical connector is part of a charge port assembly of the electrified vehicle.

12. The electrified vehicle as recited in claim 10, wherein the electrified powertrain component is an on-board charger module, a traction battery pack, a power electronics module, or an electric machine.

13. The electrified vehicle as recited in claim 10, wherein the housing is comprised of a thermally conductive polymer that includes a conductive filler.

14. The electrified vehicle as recited in claim 13, wherein the conductive filler includes aluminum nitride or boron nitride.

15. The electrified vehicle as recited in claim 10, wherein the first heat exchanger channel includes a plurality of heat transfer augmentation features, wherein the plurality of heat transfer augmentation features are configured as axial ribs, pins, or a lattice structure.

16. The electrified vehicle as recited in claim 10, wherein the integrated cooling circuit includes an inlet junction passage and an outlet junction passage connected to the first heat exchanger channel, wherein the inlet junction passage connects to an inlet passage formed inside the housing, and the outlet junction passage connects to an outlet passage formed inside the housing.

17. The electrified vehicle as recited in claim 10, comprising a potting compound disposed in a gap between the first heat exchanger channel and the bus bar.

18. An electrical connector, comprising:
a housing;
a bus bar extending inside the housing; and
an integrated cooling circuit formed inside the housing at a location adjacent to the bus bar, the integrated cooling circuit including:
a first heat exchanger channel disposed on a first side of the bus bar;
a second heat exchanger channel disposed on a second side of the bus bar;
a first inlet junction passage and a first outlet junction passage connected to the first heat exchanger channel;
a second inlet junction passage and a second outlet junction passage connected to the second heat exchanger channel;
an inlet passage connected to the first inlet junction passage and the second inlet junction passage and adapted for introducing a fluid into the first heat exchanger channel and the second heat exchanger channel; and
an outlet passage connected to the first outlet junction passage and the second outlet junction passage and adapted for expelling the fluid from the first heat exchanger channel and the second heat exchanger channel.

19. The electrical connector as recited in claim 1, wherein at least a portion of the bus bar is located axially between the first heat exchanger channel and the second heat exchanger channel.

20. The electrical connector as recited in claim 1, comprising a second bus bar, a third heat exchanger channel disposed on a first side of the second bus bar, and a fourth heat exchanger channel disposed on a second side of the second bus bar.

\* \* \* \* \*